(12) United States Patent
Depraete et al.

(10) Patent No.: US 9,341,250 B1
(45) Date of Patent: May 17, 2016

(54) HYDROKINETIC TORQUE COUPLING DEVICE HAVING TURBINE-PISTON LOCKUP CLUTCH, AND RELATED METHODS

(71) Applicant: VALEO EMBRAYAGES, Amiens (FR)

(72) Inventors: Alexandre Depraete, Bloomfield, MI (US); Zane Yang, Troy, MI (US)

(73) Assignee: Valeo Embrayges (FR)

( * ) Notice: Subject to any disclaimer, the term of this patent is extended or adjusted under 35 U.S.C. 154(b) by 5 days.

(21) Appl. No.: 14/562,099

(22) Filed: Dec. 5, 2014

(51) Int. Cl.
*F16H 45/02* (2006.01)
*F16F 15/134* (2006.01)

(52) U.S. Cl.
CPC ........... *F16H 45/02* (2013.01); *F16F 15/13469* (2013.01); *F16H 2045/0205* (2013.01); *F16H 2045/0231* (2013.01); *F16H 2045/0263* (2013.01); *F16H 2045/0278* (2013.01); *F16H 2045/0294* (2013.01)

(58) Field of Classification Search
CPC .......... F16H 41/288; F16H 2045/0205; F16H 2045/0231; F16H 2045/0278; F16H 2045/0236; F16H 2045/0226; F16H 2045/0221; F16H 2045/0263; Y10T 29/4933; F16F 15/13469; F16F 15/13484
See application file for complete search history.

(56) References Cited

U.S. PATENT DOCUMENTS

| | | |
|---|---|---|
| 2,130,895 A | 9/1938 | Ness |
| 2,860,747 A | 11/1958 | Kelley |
| 2,992,713 A | 7/1961 | Stump et al. |
| 3,041,892 A | 7/1962 | Schjolin |
| 3,252,352 A | 5/1966 | General et al. |
| 4,041,701 A | 8/1977 | Goto et al. |
| 5,713,442 A | 2/1998 | Murata et al. |
| 5,813,505 A | 9/1998 | Olsen et al. |
| 6,915,886 B2 | 7/2005 | Dacho et al. |
| 7,191,879 B2 | 3/2007 | Arhab et al. |
| 7,445,099 B2 | 11/2008 | Maucher et al. |
| 8,276,723 B2 | 10/2012 | Verhoog et al. |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

U.S. Appl. No. 14/510,244, filed Oct. 9, 2014, First Named Inventor: Alexandre Depraete.

(Continued)

*Primary Examiner* — Richard Lorence
*Assistant Examiner* — David Morris
(74) *Attorney, Agent, or Firm* — Berenato & White, LLC

(57) ABSTRACT

A hydrokinetic torque coupling device includes an impeller, a casing having a first engagement surface, a turbine-piston hydrodynamically drivable by the impeller, and a bearing device. The turbine-piston is axially displaceable into and out of a lockup mode. The bearing device includes a non-axially oriented spring and a substantially incompressible rolling member urged by the spring against an oblique contact surface associated with the turbine-piston to thereby exert a variable axial force against the turbine-piston shell for biasing the turbine-piston out of the lockup mode. The variable axial force exerted by the bearing device against the turbine-piston shell decreases as the turbine-piston is axially displaced towards the lockup mode.

20 Claims, 9 Drawing Sheets

(56) References Cited

U.S. PATENT DOCUMENTS

| | | | |
|---|---|---|---|
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2004/0251104 A1* | 12/2004 | Abe | F16H 45/02 192/3.29 |
| 2006/0086584 A1 | 4/2006 | Maucher et al. | |
| 2013/0140122 A1* | 6/2013 | Hemphill | F16D 39/00 192/3.25 |
| 2013/0230385 A1* | 9/2013 | Lindemann | F16D 33/18 415/122.1 |
| 2014/0014454 A1 | 1/2014 | Davis | |
| 2014/0014455 A1 | 1/2014 | Davis | |
| 2014/0097055 A1 | 4/2014 | Lindemann et al. | |
| 2014/0110207 A1 | 4/2014 | Davis | |

FOREIGN PATENT DOCUMENTS

| | | |
|---|---|---|
| DE | 10226860 A1 | 12/2003 |
| EP | 0125428 A1 | 11/1984 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| JP | 58-131466 A | 8/1983 |
| KR | 101311531 B1 | 9/2013 |
| WO | 2004046574 A1 | 6/2004 |

OTHER PUBLICATIONS

U.S. Appl. No. 14/510,267, filed Oct. 9, 2014, First Named Inventor: Alexandre Depraete.

U.S. Appl. No. 14/522,189, filed Oct. 23, 2014, First Named Inventor: Alexandre Depraete.

U.S. Appl. No. 14/522,263, filed Oct. 23, 2014, First Named Inventor: Alexandre Depraete.

U.S. Appl. No. 14/522,302, filed Oct. 23, 2014, First Named Inventor: Alexandre Depraete.

U.S. Appl. No. 14/522,333, filed Oct. 23, 2014, First Named Inventor: Alexandre Depraete.

U.S. Appl. No. 14/522,361, filed Oct. 23, 2014, First Named Inventor: David Werthman.

U.S. Appl. No. 14/522,372, filed Oct. 23, 2014, First Named Inventor: Alexandre Depraete.

U.S. Appl. No. 14/522,393, filed Oct. 23, 2014, First Named Inventor: Alexandre Depraete.

U.S. Appl. No. 14/561,961, filed Dec. 5, 2014, First Named Inventor: Alexandre Depraete.

U.S. Appl. No. 14/562,022, filed Dec. 5, 2014, First Named Inventor: Alexandre Depraete.

U.S. Appl. No. 14/562,064, filed Dec. 5, 2014, First Named Inventor: Alexandre Depraete.

U.S. Appl. No. 14/562,136, filed Dec. 5, 2014, First Named Inventor: Alexandre Depraete.

U.S. Appl. No. 14/562,216, filed Dec. 5, 2014, First Named Inventor: Sungchul Lee.

U.S. Appl. No. 14/562,253, filed Dec. 5, 2014, First Named Inventor: Alexandre Depraete.

U.S. Appl. No. 14/562,286, filed Dec. 5, 2014, First Named Inventor: Alexandre Depraete.

U.S. Appl. No. 14/687,602, filed Apr. 15, 2015, First Named Inventor: Alexandre Depraete.

Lindemann et al., "iTC—Innovative Solutions for Torque Converters Pave the Way into the Future", Torque Converter 20, pp. 280-301.

* cited by examiner

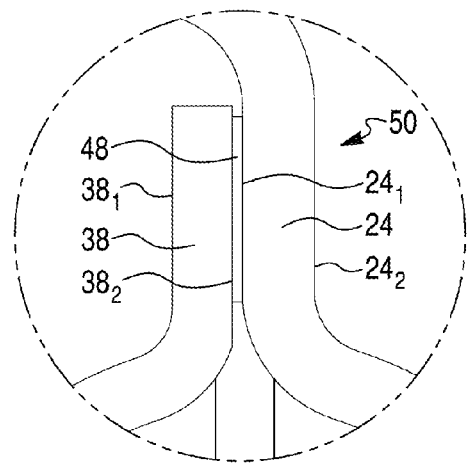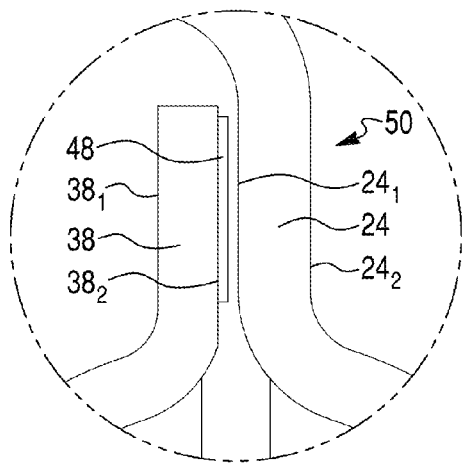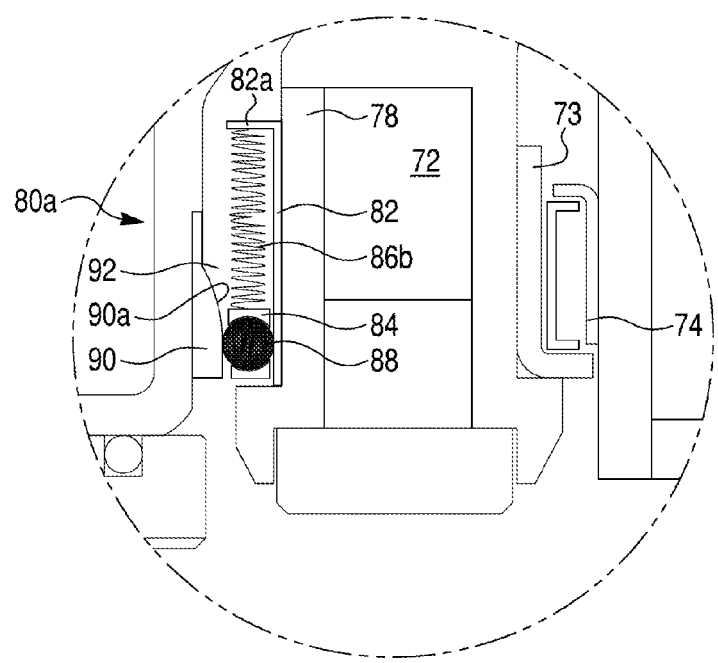

HYDROKINETIC TORQUE COUPLING DEVICE HAVING TURBINE-PISTON LOCKUP CLUTCH, AND RELATED METHODS

BACKGROUND OF THE INVENTION

1. Field of the Invention

The present invention generally relates to hydrokinetic torque coupling devices, and more particularly to a hydrokinetic torque coupling device including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, a hydrokinetic torque coupling device for coupling together a driving shaft and a driven shaft is provided. The torque coupling device includes an impeller rotatable about rotational axis and having an impeller shell, a casing having a first engagement surface, a turbine-piston hydrodynamically drivable by the impeller and associated with an oblique contact surface, and a bearing device. The turbine-piston includes a turbine-piston shell and has a second engagement surface facing the first engagement surface, the turbine-piston being axially displaceable to move the second engagement surface toward and away from the first engagement surface to position the hydrokinetic torque coupling device into and out of a lockup mode in which the turbine-piston is mechanically locked with the casing so as to be non-rotatable relative to the casing. The bearing device includes a non-axially oriented spring and a substantially incompressible rolling member urged by the spring against the oblique contact surface associated with the turbine-piston to thereby exert a variable axial force against the turbine-piston shell for biasing the turbine-piston shell out of the lockup mode, wherein the variable axial force exerted by the bearing device against the turbine-piston shell decreases as the turbine-piston is axially displaced towards the lockup mode.

A second aspect of the invention provides a hydrokinetic torque coupling device for coupling together a driving shaft and a driven shaft is provided. The torque coupling device includes an impeller rotatable about rotational axis and having an impeller shell, a casing having a first engagement surface, a turbine-piston hydrodynamically drivable by the impeller and associated with an oblique contact surface, an output hub, a damper assembly interconnecting the turbine-piston to the output hub, and a bearing device. The turbine-piston includes a turbine-piston shell and has a second engagement surface facing the first engagement surface, the turbine-piston being axially displaceable to move the second engagement surface toward and away from the first engagement surface to position the hydrokinetic torque coupling device into and out of a lockup mode in which the turbine-piston is mechanically locked with the casing so as to be non-rotatable relative to the casing. The bearing device includes a non-axially oriented spring and a substantially incompressible rolling member urged by the spring against the oblique contact surface to thereby exert a variable axial force against the turbine-piston shell for biasing the turbine-piston shell out of the lockup mode, wherein the variable axial force exerted by the bearing device against the turbine-piston shell decreases as the turbine-piston is axially displaced towards the lockup mode.

A third aspect of the invention provides a method of assembling a hydrokinetic torque coupling device for coupling a driving shaft and a driven shaft together. A torque converter rotatable about a rotational axis is provided. The torque converter includes an impeller having an impeller shell, a turbine-piston hydrodynamically drivable by the impeller and including a turbine-piston shell, and a bearing device. A casing shell is operatively connected to the impeller shell to form a casing that is rotatable about the rotational axis and has a first engagement surface. The turbine-piston is axially displaceable relative to the impeller between a hydrodynamic transmission mode in which the first engagement surface and a second engagement surface of the turbine-piston are spaced from and not frictionally engaged with one another and a lockup mode in which the first and second engagement surfaces are frictionally engaged with one another to mechanically lock the turbine-piston with the casing so as to be non-rotatable relative to the casing. The bearing device includes a non-axially oriented spring and a substantially incompressible rolling member urged by the spring against an oblique contact surface associated with the turbine-piston to thereby exert a variable axial force against the turbine-piston shell for biasing the turbine-piston shell out of the lockup mode, wherein the variable axial force exerted by the bearing device against the turbine-piston shell decreases as the turbine-piston is axially displaced towards the lockup mode.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIGS. 2A and 2B are enlarged fragmentary views of circle 2 of FIG. 1, showing the hydrokinetic torque coupling device in lockup mode and out of lockup mode, respectively;

FIG. 3 is an enlarged fragmentary view of circle 3 of FIG. 1, showing a variable-stiffness bearing device of the first embodiment;

Figure 1:
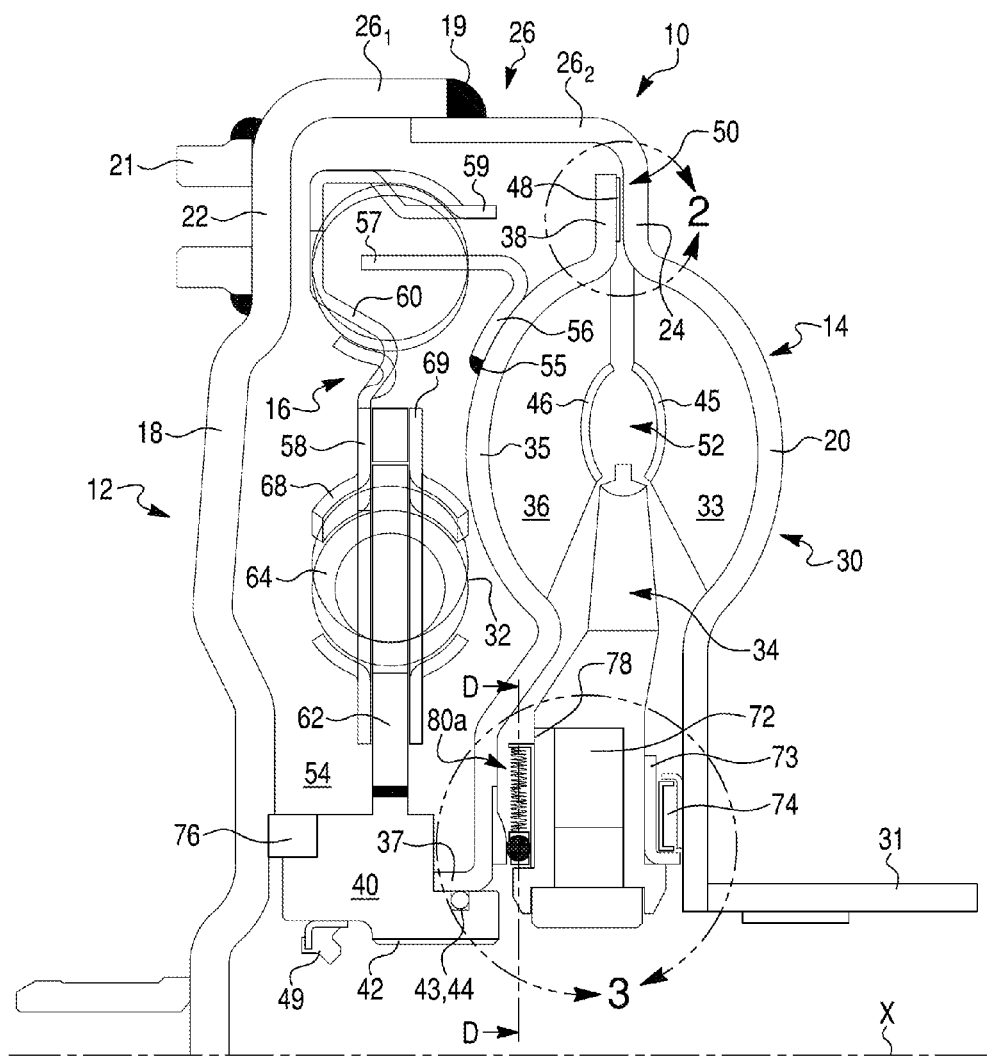
FIG. 1 is a fragmented half-view in axial section of a hydrokinetic torque coupling device equipped with a turbine-piston and variable-stiffness bearing devices in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. FIG. 1 and shows a half-view, that is, the portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 fixedly and sealingly connected together, such as by weld 19 at their outer peripheries, so as to be non-movable relative to one another yet rotatable about axis X. The first shell 18 is non-movably (i.e., fixedly) interconnected to the driving shaft, more typically a flywheel (not shown) that is non-rotatably fixed to the driving shaft, so that the casing 12 rotates at the same speed that the engine operates. Specifically, in the illustrated embodiment of FIG. 1 the casing 12 is rotatably driven by the internal combustion engine and is coupled and non-rotatable relative to the flywheel thereof with studs 21, shown in FIG. 1. Each of the first and second casing shells 18, 20 may be made, for example, integral by press-forming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. The second sidewall portion 24 includes a first engagement surface $24_1$ within the interior of the casing 12 and a second surface $24_2$ outside the interior of the casing 12, as best shown in the enlarged fragmentary views of FIGS. 2A and 2B. The first and second outer wall portions $26_1$, $26_2$ collectively establish an annular outer wall 26 substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

The torque converter 14 includes an impeller (sometimes referred to as the pump or impeller wheel) 30, a turbine-piston 32, and a stator (sometimes referred to as the reactor) 34 situated axially between and operatively connecting the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes an impeller core ring 45, and a plurality of impeller blades 33 fixedly attached, such as by brazing, to the impeller shell 20 and the impeller core ring 45. The impeller 30, including the impeller shell 20, the impeller core ring 45, and the impeller blades 33, is secured to the first casing shell 18 by the weld 19 so as to be non-rotatable relative to the casing 12 and hence to the drive shaft (or flywheel) of the engine so that the impeller 30 rotates at the same speed as the engine output shaft. The impeller 30 also includes an impeller hub 31 fixedly secured to the impeller shell 20. The impeller hub 31 is arranged for engagement with a hydraulic pump of the transmission.

The hydrokinetic torque coupling device 10 further includes an output hub 40 that is rotatable about the rotational axis X. The output hub 40 is operatively coupled to and coaxial with the driven shaft. For example, the output hub 40 may be provided with internal splines 42 for non-rotatably coupling the output hub 40 to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 49 is mounted to a radially inner peripheral surface of the output hub 40 to create a seal at the interface of a transmission input shaft (not shown) and the output hub 40.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35. The spinning of the impeller 30 causes transmission fluid in the torus to spin the turbine blades 36, and hence the turbine-piston shell 35. The impeller shell 20 and the turbine-piston shell 35 collectively define a substantially toroid-shaped inner chamber (or torus chamber) 52 therebetween.

Extending axially at a radially inner peripheral end of the turbine-piston shell 35 is a substantially cylindrical flange 37 that is proximate to the rotational axis. The substantially cylindrical flange 37 of the turbine-piston 32 is rotatable relative to the output hub 40. The sealing member (e.g., O-ring) 44 received in the slot 43 creates a seal at the interface of the substantially cylindrical flange 37 and the output hub 40. As discussed in further detail below, the turbine-piston 32 is axially movably relative to the output hub 40 along this interface. Abutment of the end of the flange 37 against the output hub 40, as shown in FIG. 1, limits axial displacement of the turbine-piston 32 to a maximum axial displacement position. The output hub 40 thus acts as a stop feature with respect to axial displacement of the turbine-piston 32.

The piston component of the turbine-piston 32 includes a substantially annular, planar (i.e., flat) turbine-piston flange (or turbine-piston wall) 38. The turbine-piston flange 38 is distal to the rotational axis X relative to the above-discussed proximal flange 37. The turbine-piston flange 38 is a radial extension of the turbine-piston shell 35 and, as illustrated in FIG. 1, is disposed radially outside of the turbine blades 36. The turbine-piston flange 38 and the turbine-piston shell 35 are embodied as integral with one another, e.g., made of a single or unitary component, but may be separate components connected together. The turbine-piston flange 38 extends from a radially outer peripheral end of a toroidal portion of the turbine-piston shell 35 radially outward, transverse to rotational axis X, to terminate at an end in spaced relationship to the inner peripheral surface of the annular outer wall portion 26 of the casing 12.

Returning to FIGS. 2A and 2B, the turbine-piston flange 38 has a first surface $38_1$ and an opposite second engagement surface $38_2$ respectively facing away from and towards the first engagement surface $24_1$ of the second sidewall portion 24. The first and second engagement surfaces $24_1$ and $38_2$ are nearly parallel to and face one another, and extend radially at approximately 90 degree angle relative to the rotational axis X. The second engagement surface $38_2$ faces and, as explained below, is movable axially toward and away from the first engagement surface $24_1$ to position the coupling device 10 into and out of a lockup mode, respectively.

In accordance with the first exemplary embodiment, the second engagement surface $38_2$ is provided with a friction ring (or friction lining) 48, best shown in FIGS. 2A and 2B, which shows a lockup clutch 50 in a lockup mode and a non-lockup mode, respectively. The friction ring 48 may be secured to the second engagement surface $38_2$, for example, by adhesive bonding and/or with fasteners. The friction ring 48 is made of a friction material for improved frictional performance. Alternatively, a friction ring (or friction lining) may be secured to the first engagement surface $24_1$. According to still another embodiment, the first engagement surface $24_1$ includes a first friction ring or liner and the second (engagement) surface $38_2$ includes a second friction ring or liner. It is within the scope of the invention to omit one or both of the friction rings.

Returning to FIG. 1, the stator 34 is positioned axially between the impeller 30 and turbine-piston 32 to redirect fluid from the turbine-piston 32 back to the impeller 30 in an efficient manner. The stator 34 typically includes a one-way clutch 72 to prevent the stator 34 from counter-rotation. On one side of the stator 34, a thrust bearing 74 is interposed between a stator side wall bracket 73 and the impeller shell 20 of the casing 12. On the opposite side of the stator, a bearing device 80a is positioned between the side wall of the base of the stator 34 and the turbine-piston shell 35. The bearing device 80a is shown mounted radially outside of a stator plate/disk 78. The device 80a of the first exemplary embodiment is further explained in reference to FIGS. 3-8 below.

In the lockup mode, the first and second engagement surfaces $24_1$ and $38_2$ (including the friction ring(s) 48 secured thereto) are pressed together such that the turbine-piston flange 38 is frictionally non-rotatably coupled to the second radial portion 24 of the casing 12, thereby mechanically locking the turbine-piston 32 to the casing 12 in the lockup mode. When not in the lockup mode, including at the maximum axial displacement position, the first and second engagement surfaces $24_1$ and $38_2$ are spaced from one another, such that the turbine-piston flange 38 is not frictionally non-rotatably coupled to the second radial portion 24 of the casing 12. In the non-lockup mode, normal operation of the torque converter 14 selectively fluidly couples and decouples the impeller 30 to and from the turbine-piston 32.

The damper assembly 16 is housed in the casing 12 axially between the turbine-piston 32 and the first casing shell 18, as shown in FIG. 1. The damper assembly 16 is connected to a drive (or input) member 56 (discussed below), and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1 and other embodiments discussed herein, the first and second damping members 60, 64 are configured as helical (or coil) springs having principal axes oriented substantially circumferentially. Other elastic members may be selected to replace or supplement the springs.

The drive member 56 is fixedly connected to the turbine-piston shell 35 of the turbine-piston 32, such as by weld 55, which may be a continuous annular weld. The output side of the drive member 56 has a plurality of driving tabs 57 (FIG. 1) extending axially in the direction away from the turbine-piston 32. The driving tabs 57 of the drive member 56 are circumferentially equidistantly spaced from one another, and engage first circumferential ends of the first damping members 60.

The intermediate member 58 has a plurality of driven tabs 59 extending axially in an opposition direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 of the damper assembly 16 is rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston shell 35 between its lockup and non-lockup modes. As discussed in greater detail below, when the turbine-piston shell 35 is displaced axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 is connected to, and may be integrally formed as a single piece with, a first disk part 68 on a first side of the second damping members 64. The first disk part 68 is secured to and is non-moveable relative to a second disk part 69 on the opposite side of the second damping members 64, such as by rivets or welding. The first and second disk parts 68, 69 establish an input part to the second damping members 64.

The driven member 62 establishes an output part relative to the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is fixedly connected to so as to be non-rotatable relative to the output hub 40. The non-rotatable connection between the driven member 62 and the output hub 40 may be formed by splines and/or welding. Alternatively, the output hub 40 and driven member 62 may be integral with one another. A thrust bearing 76 is positioned between the output hub 40 and the first casing shell 18.

As discussed above, the turbine-piston 32 is axially movable toward and away from the impeller shell 20 between a lockup position and a non-lockup (open) position. Axial movement of the turbine-piston 32 is accomplished by changing the pressure difference between the torus chamber 52 and the damper chamber 54 on the opposite sides of the turbine-piston shell 35, as discussed in further detail below. When the torque converter 14 is in hydrodynamic transmission mode, the action of the transmission fluid can generate an axial load which urges the turbine-piston 32 toward the impeller 30. This axial load may vary depending on speed, torque, etc. The axial load generated by the hydraulic fluid can be sufficiently high to move the turbine-piston 32 into contact with the impeller 30 and into lockup mode prematurely.

The possibility of such premature lockup of the torque converter 14 can be reduced by inserting a linear spring axially between the side wall of the stator 34 and the turbine-piston shell 35 to bias the turbine-piston away from lockup mode. However, an axially oriented linear spring exerts a force that is proportion to axial displacement of the turbine-piston 32 caused by the spring force. As the turbine-piston 32 moves closer to the impeller 30 into the lockup mode, the linear spring will exert a proportionally greater axial force on the turbine-piston shell 35. The increasing force exerted by the linear spring can slow the response lockup time of the torque converter 14, particularly as the linear spring proportionally increases its biasing force as the turbine-piston 32 moves close to lockup mode. The increased axial force exerted by the linear spring near lockup can significantly increase the hydraulic pressure required to move the turbine-piston 32 sufficiently to close the torque converter 14 into the lockup mode, thereby increasing hydraulic pump demands.

Figure 4:
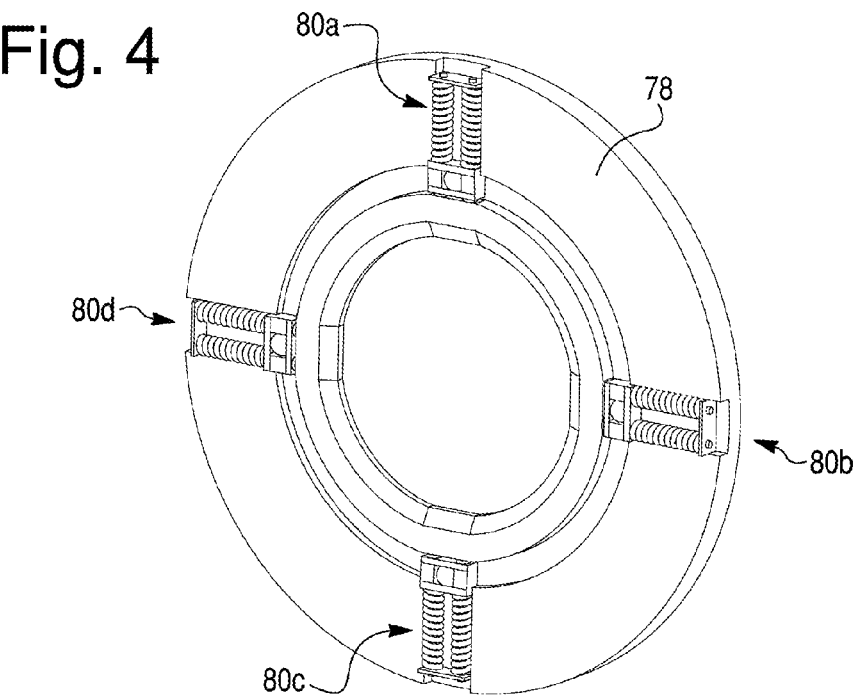
FIG. 4 is an enlarged, perspective view of a stator plate containing a plurality of the variable-stiffness bearing devices of FIG. 1.
Figure 5:
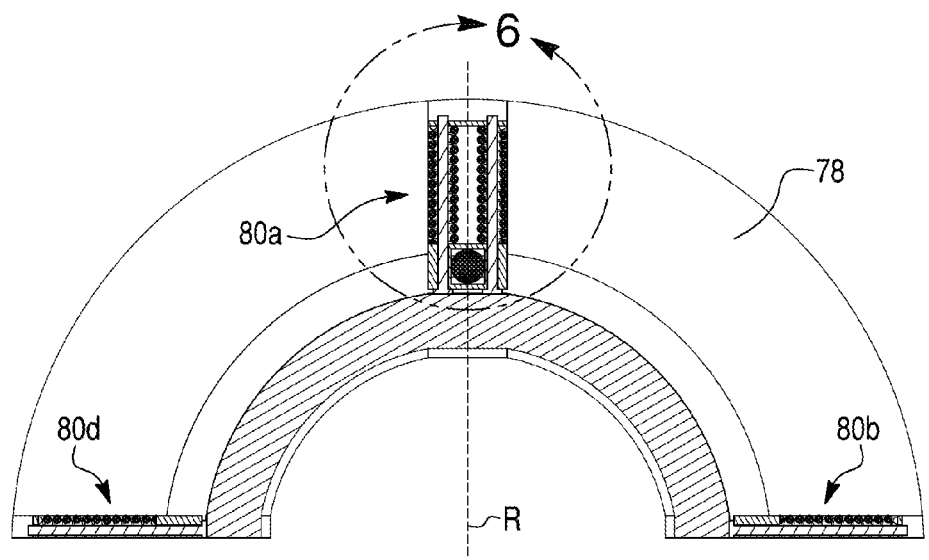
FIG. 5 is a front elevational upper half view of FIG. 4.
Figure 6:
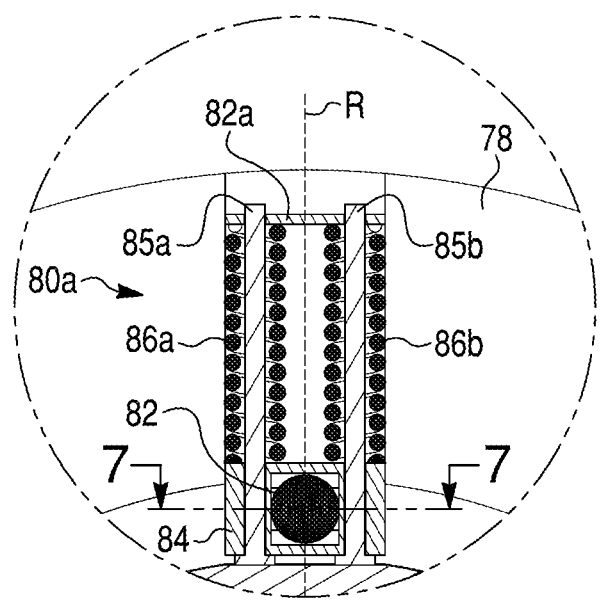
FIG. 6 is an enlarged fragmentary view of the fragment in circle 6 of FIG. 5.

To overcome this problem associated with such as linear spring, the hydrodynamic torque coupling device 10 of the first illustrated embodiment includes bearing devices 80a-80d having nonlinear force-displacement characteristics, or variable stiffness characteristics. As best shown in FIG. 4, the first embodiment includes four bearing devices 80a, 80b, 80c, and 80d situated in corresponding recesses of the stator plate 78. In the interest of brevity, only the bearing device 80a will be described below, understanding that the other bearing devices 80b, 80c, and 80d have similar structures and operate similarly if not identically to bearing device 80a. The bearing devices 80a and 80c are diametrically opposed from one another. The bearing devices 80b and 80d are diametrically opposed from one another, and are set 90 degrees from the bearing devices 80a and 80c, so that adjacent bearing devices 80a, 80b, 80c, and 80d are circumferentially equidistant from one another.

As best shown in FIGS. 3-7, the bearing device 80a (as well as the other bearing devices 80b, 80c, and 80d) includes a main housing 82 extending lengthwise along a radial line R within a corresponding radially extending recess of the stator plate 78. The main housing 82 has a radially outer flanged end 82a and a radially inner socketed housing 84. The socketed housing 84 includes axially opposite sockets or windows 84a. First and second rods 85a and 85b extend parallel to one another and parallel to the radial line R along a substantially radial path from the radially outer flanged end 82a to the radially inner end of the socketed housing 84. Coiled around the first and second rods 85*a* and 85*b* are springs 86*a* and 86*b*, respectively, extending substantially radially from the flanged end 82*a* of the main housing 82 to the socketed housing 84. A non-compressible rolling member (e.g., a ball or cylinder) 88, such as a metal (e.g., hard steel) or hard plastic roller ball, is retained in the socketed housing 84.

Figure 7:
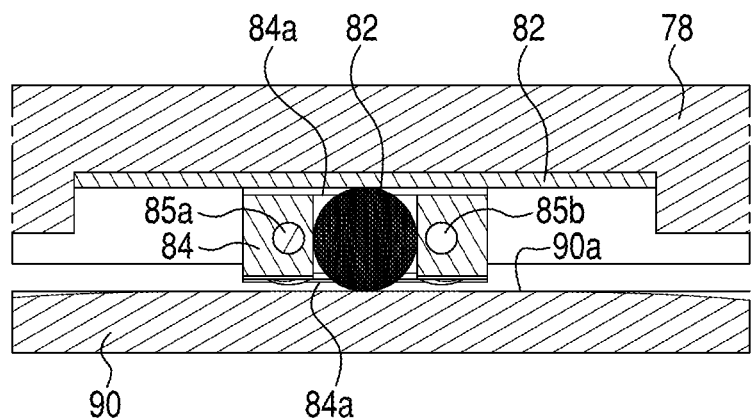
FIG. 7 is a sectional view taken along sectional line 7-7 of FIG. 6.

As best shown in FIGS. 3, 4, and 7, the rolling member 88 protrudes axially from opposite sides of the socketed housing 84 through the windows 84*a*. On one side (right in FIG. 3), the portion of the rolling member 88 protruding through the window 84*a* is in rolling contact with the main housing 82. The diametrically opposite portion of the rolling member 88 protruding through the other window (also numbered 84*a* on the left side in FIG. 3) is in rolling contact with a bearing contact body 90 mounted on, non-rotational relative to, and axially movable with the turbine-piston shell 35.

The bearing contact body 90 has an oblique contact surface 90*a*. The bearing contact body 90 may be embodied as a cam comprising a ring mounted on or otherwise associated with (e.g., integrated into) the turbine-piston shell 35. In the first illustrated embodiment, the oblique contact surface 90*a* at radially inner end portion of the contact body 90 is curved, or as shown eccentrically (variably) curved similar to a cam surface. The oblique contact surface 90*a* and the side surface of the main housing 82 facing the contact surface 90*a* collectively define a radially extending tapering cavity 92.

Figure 8:
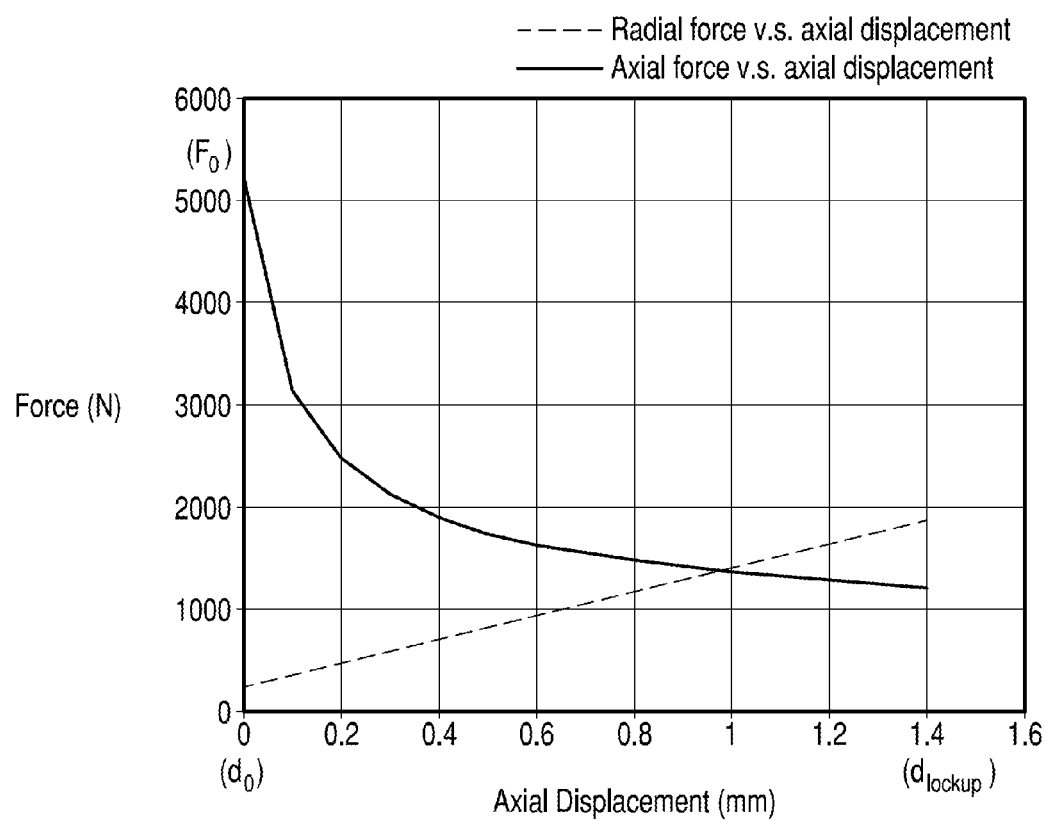
FIG. 8 is a diagram showing the relationship between displacement in mm (x-axis) versus force in N (y-axis) for exemplary variable-stiffness bearing devices.

FIG. 8 is a force-displacement diagram for the bearing devices 80*a*-80*d*. Axial displacement position $d_0$ of the bearing devices 80*a*-80*d* in FIG. 8 corresponds to the turbine-piston 32 positioned farthest away from its lockup mode, as embodied in FIG. 1 by the end of the flange 37 abutting the output hub 40, i.e., at the maximum axial displacement position. As shown in FIG. 8, at the axial displacement position $d_0$ the bearing devices 80*a*-80*d* collectively exert a peak "preload" force to resist movement of the turbine-piston 32 axially towards the lockup mode. This peak preload force is desirably sufficiently high to prevent premature lockup of the lockup clutch 50 that might unintentionally be caused by an axial load generated by the action of the transmission fluid in the torque converter 14 operating in the hydrodynamic transmission mode. The peak axial force is set slightly higher than the axial load generated by the action of the transmission fluid in the torque converter 14 operating in the hydrodynamic transmission mode. For example, in FIG. 8 the applied force at $d_0$ is slightly greater than 5 kN to prevent the turbine thrust load of the torque converter 14 operating in the hydrodynamic transmission mode under normal conditions from prematurely urging the turbine-piston 32 towards the impeller 30 and into lockup.

As the hydraulic pressure in the damper chamber 54 is increased relative to the torus chamber 52 to overcome an initial peak force $F_0$ of the bearing devices 80*a*-80*d*, such as by introducing hydraulic fluid into the damper chamber 54, the turbine-piston 32 moves towards the lockup mode. As the turbine-piston 32 moves into closer proximity to the lockup mode, i.e., as axial displacement shown in the diagram of FIG. 8 increases towards $d_{lockup}$, the axial force exerted by the bearing devices 80*a*-80*d* decreases due to the curvature of the oblique contact surface 90*a*, even if the springs 86*a* and 86*b* are linear springs. As a result, as the turbine-piston 32 is displaced closer to the lockup mode, the collective axial biasing force exerted by the bearing devices 80*a*-80*d* decreases, and the hydraulic pressure required to close the torque converter 14 into lockup mode is lessened relative to the hydraulic pressure requirements of an axially oriented linear spring, thus making lockup more energy efficient and quick. In lockup mode, the biasing force exerted by the bearing devices 80*a*-80*d* is sufficiently low to permit the engagement surfaces $24_1$ and $38_2$ (including the friction ring 48) to remain in frictional contact and mechanically locked.

Axial movement of the turbine-piston 32 is accomplished by changing the pressure differential between the opposite sides of the turbine-piston shell 35, taking into account the biasing forces applied by the bearing devices 80*a*-80*d*. Referring to FIG. 1, a torus chamber 52 is to the right side of the turbine-piston shell 35, and a damper chamber 54 is to the other (left) side of the turbine-piston shell 35. A pressure increase in the damper chamber 54 relative to the torus chamber 52 (or stated differently a pressure decrease in the torus chamber 52 relative to the damper chamber 54) sufficient to overcome the biasing force of the bearing devices 80*a*-80*d* shifts the turbine-piston shell 35 axially in the direction of torque transmission, i.e., towards the output side of the casing 12, that is left to right in FIG. 1, into the lockup mode. On the other hand, a pressure decrease in the damper chamber 54 relative to the torus chamber 52 (or stated differently a pressure increase in the torus chamber 52 relative to the damper chamber 54) shifts the turbine-piston shell 35 and the turbine-piston flange 38 axially against the direction of torque transmission, i.e., towards the input side of the casing, that is right to left in FIG. 1, out of the lockup mode. Pressure changes are created by control of the fluid, e.g., hydraulic fluid or oil, into and out of the chambers 52 and 54.

As the lockup clutch 50 moves into the lockup mode, the turbine-piston shell 35 is displaced axially towards the impeller 30 until the frictional ring 48 of the second engagement surface $38_2$ of the turbine-piston flange 38 (which moves axially with the turbine-piston shell 35) abuts against and is non-rotatably frictionally coupled to the first engagement surface $24_1$ of the casing 12. In the lockup mode, torque is transferred from the engine to the casing 12, then by way of the frictional engagement between surfaces $24_1$ and $38_2$ (including the frictional lining 48 thereof) through the turbine piston shell 35 to the drive member 56 welded thereto, then serially to the damping assembly 16 and the output hub 40. Thereby, the turbine-piston flange 38 and the casing 12 together close the lockup clutch 50 to bypass the hydrodynamic fluid coupling of the torque converter 14 and mechanically couple the driving and driven shafts. Notably, the friction ling 48 secured to the second engagement surface $38_2$ may have circumferentially spaced grooves (not shown) extending generally radially so as to fluidly connect the torus chamber 52 and the damper chamber 54 with one another in the lockup mode for cooling friction surfaces of the lockup clutch 50 by the working fluid.

As the turbine-piston 32 and the drive member 56 move axially into the lockup position as described above, the driving tabs 57 of the drive member 56 are axially displaced relative to the driven tabs 59 of the intermediate member 58. The relative axial movement of the driving tabs 57 relative to the driven tabs 59 allows the intermediate member 58, the driven member 62, and the damping members 60, 64 to remain fixed axially on the output hub 40 while the turbine-piston 32 and the drive member 56 move in the axial direction.

The relationship between the bearing devices 80*a*-80*d* and the force-displacement diagram of FIG. 8 will now be elaborated upon with reference to FIGS. 3-7. Operational axial displacement of the turbine-piston shell 35 towards the stator 34/impeller 30, such as by fluid control discussed above, as the device 10 is axially displaced into the lockup mode causes the oblique contact surface 90*a* to move towards the main housing 92, narrowing the width of the tapering cavity 92. The taper of the oblique contact surface 90*a* drives the non-compressible rolling member 88 in a substantially radially outward direction (or upward in FIG. 1), against the radially inward biasing force of the coil springs 86a, 86b. As shown in FIG. 8 by the broken line, the radial force increases proportionally with axial displacement towards $d_{lockup}$. However, the oblique (that is cam-like in FIGS. 1-7) contact surface 90a converts the linear radial biasing force of the bearing devices 80a-80d into a variably decreasing axial force. Stated differently, the slope of the axial force versus displacement curve of FIG. 8 is negative, whereas the slope of the radial fore versus axial displacement curve of the linear springs 86a, 86b is positive. In this manner, even though the bearing devices 80a-80d are provided with linear springs 86a, 86b that increase their exerted radial force as the torque converter 14 moves towards lockup, the devices 80a-80d as a whole act as variable-stiffness bearing devices that decrease their exerted axial force as the torque converter moves towards lockup. Although the longitudinal stiffness of the coil springs 86a, 86b is constant, the axial stiffness of the turbine-piston shell 35 is not because of varied curvature at contact between the rolling member 88 and the contact surface 90a, which as noted above may be shaped as a cam surface. By adjusting the profile of the surface 90a, any desired axial force as a function of axial displacement of the turbine can be achieved. For example, as the surface 90a is given greater curvature, the rate of change of its slope become more dramatic, and the axial force versus displacement curve shown in FIG. 7 will be decreased as the turbine-piston moves towards the impeller.

Movement of the lockup clutch 50 out of lockup mode involves displacing the turbine-piston 32 axially away from the impeller 30, axially moving the turbine-piston shell 35 and the turbine-piston flange 38 until the second engagement surface $38_2$ (including the frictional lining 48 thereof) is spaced from and no longer non-rotatably frictionally coupled to the first engagement surface $24_1$. Thus, torque transferred from the engine to the casing 12 does not bypass the torque converter 14 through the lockup clutch 50. As the width of the cavity 92 increases with movement of the lockup clutch 50 out of lockup mode, the radially inward biasing force of the coil springs 86a, 86b urges the rolling member 88 in a substantially inward radial direction (or downward in FIG. 1). The rolling member 88 moves radially inward along contact surface 90a, thereby assisting in urging the turbine-piston shell 35 axially away from the stator 34. The axial force applied by the bearing devices 80a-80d is a function of the curvature of the oblique contact surface 90a. The curvature of the force-displacement curve of FIG. 8 may be modified by modifying the oblique contact surface 90a. However, the oblique contact surface 90a is preferably designed to increase the axial force exerted by the bearing devices 80a-80d as the turbine-piston 32 moves towards its maximum displacement position, or from right to left in FIG. 8. Notably, in the non-lockup mode an open fluid passage is established between the first engagement surface $24_1$ of the casing 12 and the second engagement surface $38_2$. Hydraulic fluid is free to flow between the torus chamber 52 and the damper chamber 54 through the passage.

In operation, the lockup clutch is generally activated after the hydraulic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston.

The turbine-piston 32 both forms the shell component of the turbine and the piston component of the lockup clutch, as described above. By consolidating two components that are normally separate from one another into a single component, space is saved in the torque hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment. Examples of variations and modifications include modifying the damper assembly 16 to include only damping members 60 or damping members 64, or to include additional damping members. The apparatus 80 likewise may be modified, changed, and altered. Components may be eliminated, such as the rods 85a, 85b, for example, and additional components may be added. For example, the bearing devices 80a may include two, three, or more rolling members 88. The oblique contact surface 90a may be an integral part of the turbine-piston shell 35. The oblique contact surface 90a is a revolved surface having the same profile at any radial cross section about the rotational axis. The hydrokinetic torque coupling device 10 may have a different number, although preferably an even number (e.g., 2, 4, 6, 8, 10, 12, 14, 16, etc.), of variable-stiffness bearing devices. Preferably at least two variable-stiffness bearing devices are used. For example, the hydrokinetic torque coupling device may contain sixteen (16) bearing devices 80 if space permits. Increasing the number of bearing devices increases loading capacity. As another modification, the adjacent bearing devices 80 are not necessarily circumferentially spaced equidistant from one another. According to another modification, the bearing devices 80 are not all identical to one another.

According to further variations, modifications, and changes to the above-described exemplary embodiments, the locations of the bearing devices 80 and the bearing contact body 90 may be transposed, so that the bearing devices 80 are mounted on the turbine-piston shell 35 and the bearing contact body 90 is mounted on the stator 34. As another variation or modification, the hydrokinetic torque coupling device 10 may be provided without a stator, in which case the plate 78 of the bearing devices 80 may be mounted directly or indirectly to the impeller 30 or impeller hub 31, and bearing 74 may be removed.

Additionally modifications, changes and alterations are discussed further below. The features of the embodiment described herein may be practiced with one another and are substitutable in numerous combinations. In the interest of brevity, reference characters that are discussed above in connection with FIGS. 1-8 are not further elaborated upon below, except to the extent necessary or useful to explain the additional embodiments. Modified components and parts are indicated by the addition of one hundreds, etc. digit to the reference numerals of the components or parts for the second exemplary embodiment, etc.

Figure 9:
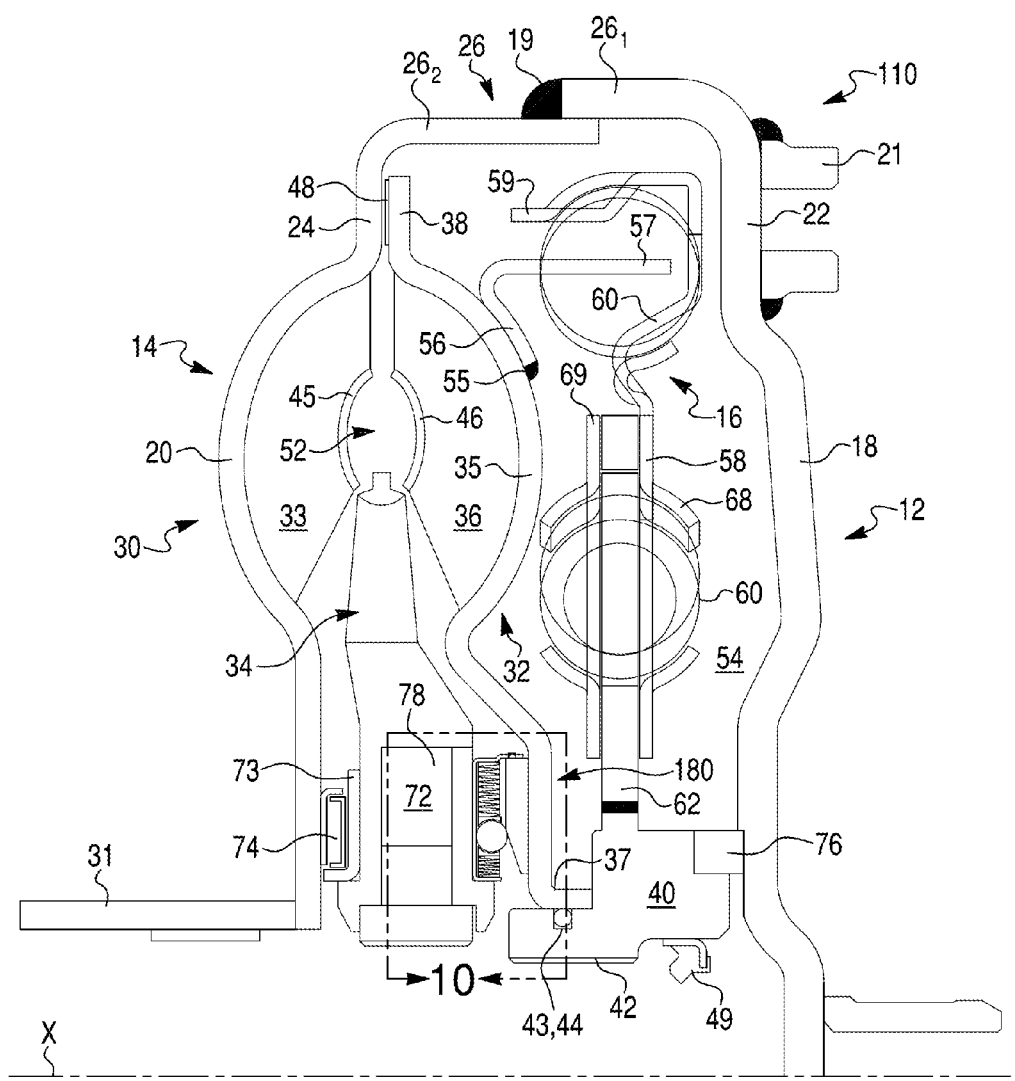
FIG. 9 is a fragmented half-view in axial section of a hydrokinetic torque coupling device equipped with a turbine-piston and variable-stiffness bearing devices in accordance with a second exemplary embodiment of the present invention
Figure 10:
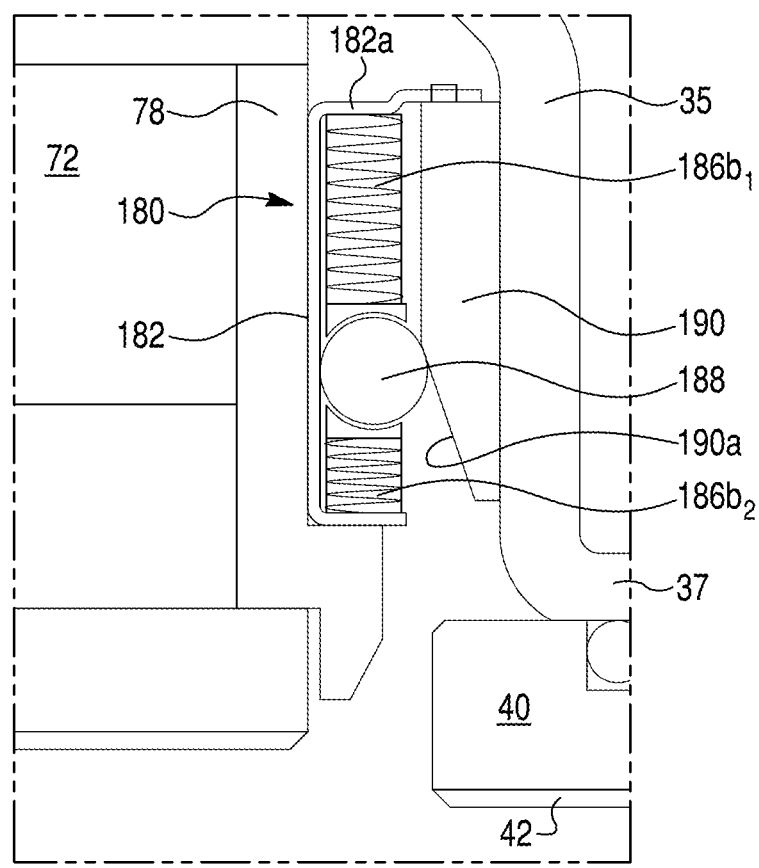
FIG. 10 is an enlarged view of the box in FIG. 9.

FIGS. 9 and 10 illustrate a second embodiment of a hydrokinetic torque coupling device 110 equipped with a turbine-piston and variable-stiffness bearing devices 180. The bearing devices 180 include main housings 182 with radially outer flanged ends 182a fastened to bearing contact bodies 190. The contact surfaces 190a of the contact bodies 190 are obliquely angled surfaces when viewed from a side sectional reference, as in FIG. 10. The bearing devices 180 includes springs $186b_1$ and $186b_2$ on diametrically opposite sides of the rolling member 188, with the springs $186b_1$ and 186$b_2$ collectively biasing the rolling member 188 radially outward to displace the lockup clutch 50 out of lockup mode. The force-displacement curve for bearing devices 180 will be similar to that of FIG. 8, with the axial force being maximum at $d_0$ (corresponding to the maximum axial displacement position of the turbine-piston 32 in its open position) and decreasing as the turbine-piston 32 is axially displaced towards $d_{lockup}$.

An exemplary method for assembling the hydrokinetic torque coupling device 10 according to the embodiment of FIGS. 1 and 2 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices 10, 110, etc. may be practiced by sequentially performing the steps as set forth below, it should be understood that the methods may involve performing the steps in different sequences.

The impeller 30, the turbine-piston 32, the stator 34, the apparatus 80, and the damper assembly 16 may each be preassembled. The turbine-piston 32 includes, as noted above, the turbine-piston shell 35, the turbine blades 36 attached to the turbine-piston shell 35 and the turbine-piston core ring 46, and the turbine-piston flange 38.

The impeller 30, the stator 34, the bearing devices 80a-80d, the bearing contact body 90, and the turbine-piston 32 sub-assemblies are assembled together as shown in the drawings. The bearing devices 80a-80d are positioned in recesses at the radially outer circumference of stator plate 78 (FIG. 4), which is mounted to on a side of the stator 34 facing the turbine-piston shell 35. The cylindrical flange 37 of the turbine-piston 32 is mounted to slidingly engage the output hub 40 (splined with or mounted on the driven shaft) with the seal 44 therebetween. The damper assembly 16 is added. The driving tabs 57 are engaged with the damper assembly 16 as described above. Then, the first casing shell 18 is non-moveably and sealingly secured, such as by welding at 19, to the second casing shell 20, as best shown in FIG. 1.

Figure 11:
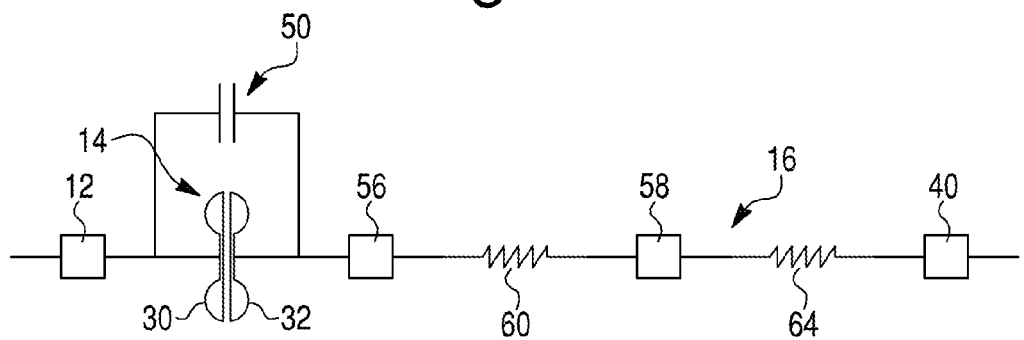
FIG. 11 is a simplified diagram of a hydrodynamic torque coupling device including a turbine-piston with a dual or double damper assembly.

The torque converters and hydrodynamic torque coupling devices described herein may incorporate different damper assemblies. For example, FIG. 11 depicts a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60, the intermediate member 58, and the elastic damping members 64 of the damper assembly 16 and the output hub 40 are arranged serially downstream of the turbine-piston shell 35 and the drive member 56 in FIG. 11. The diagram of FIG. 11 generally corresponds to the arrangement of the embodiments shown in FIGS. 1 and 9.

Figure 12:
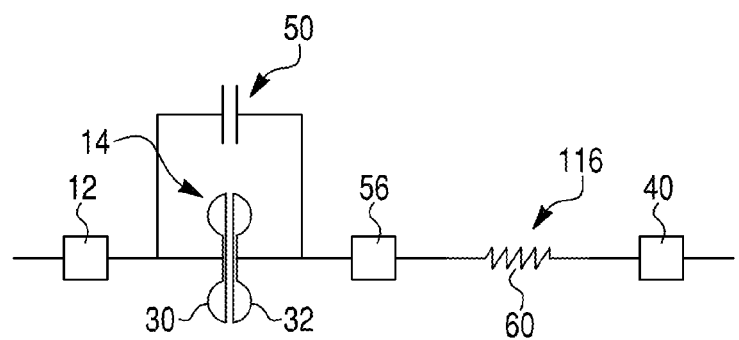
FIG. 12 is a simplified diagram of another hydrodynamic torque coupling device including a turbine-piston with a single damper assembly.

FIG. 12 depicts an alternative damper assembly 116 similar to that of FIG. 11, but in which the damper assembly 116 is modified to include only one set of circumferentially extending elastic damping members 60.

Figure 13:
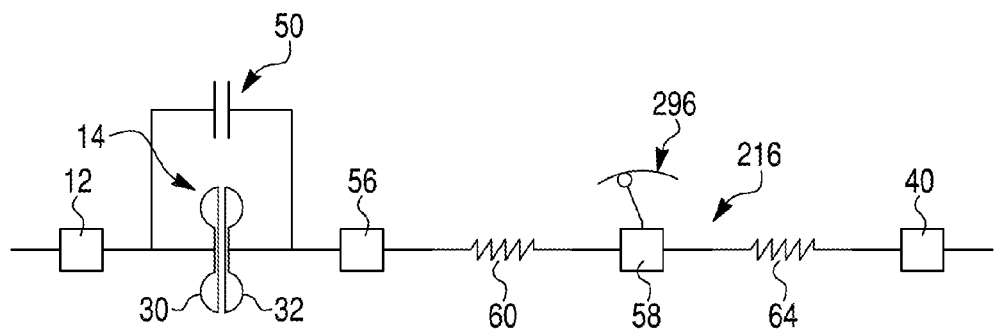
FIG. 13 is a simplified diagram of still another hydrodynamic torque coupling device including a turbine-piston with dual or double damper assemblies and a pendulum vibration absorber.

A damper assembly 216 depicted in FIG. 13 is similar to that of FIG. 11, but further includes a centrifugal pendulum oscillator 296 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 296 may be coupled to the circumference of the intermediate member 58 and may be arranged on both sides of the intermediate member 58.

Figure 14:
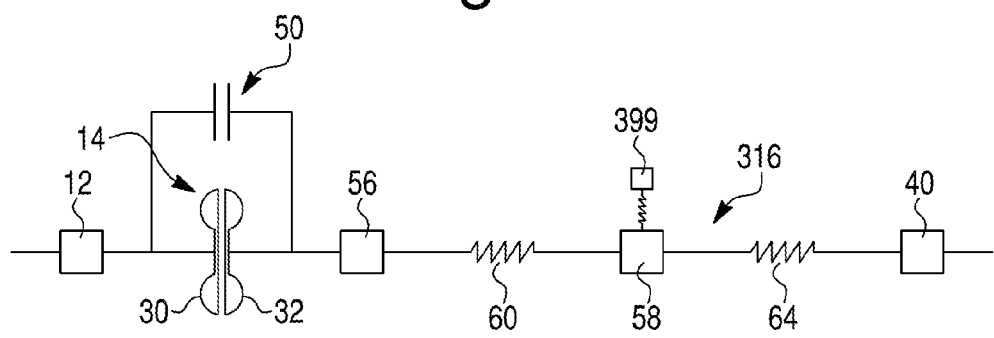
FIG. 14 is a simplified diagram of a further hydrodynamic torque coupling device including a turbine-piston with dual or double damper assemblies and a vibration absorbing spring-mass system.

A damper assembly 316 depicted in FIG. 14 is similar to that of FIG. 11, but further includes a spring mass system 399 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 399 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
    an impeller rotatable about rotational axis and comprising an impeller shell;
    a casing comprising a casing shell, the casing having a first engagement surface;
    a turbine-piston hydrodynamically drivable by the impeller and associated with an oblique contact surface, the turbine-piston comprising a turbine-piston shell and having a second engagement surface facing the first engagement surface, the turbine-piston being axially displaceable to move the second engagement surface toward and away from the first engagement surface to position the hydrokinetic torque coupling device into and out of a lockup mode in which the turbine-piston is mechanically locked with the casing so as to be non-rotatable relative to the casing; and
    a bearing device comprising a non-axially oriented spring and a substantially incompressible rolling member urged by the spring against the oblique contact surface to thereby exert a variable axial force against the turbine-piston shell for biasing the turbine-piston shell out of the lockup mode, wherein the variable axial force exerted by the bearing device against the turbine-piston shell decreases as the turbine-piston is axially displaced towards the lockup mode.

2. The hydrokinetic torque coupling device of claim 1, wherein the bearing device comprises a plurality of bearing devices circumferentially equidistantly spaced apart from one another about the rotational axis.

3. The hydrokinetic torque coupling device of claim 2, wherein the plurality is an even number of the bearing devices, and wherein each of the bearing devices is diametrically opposed to another of the bearing devices relative to the rotational axis.

4. The hydrokinetic torque coupling device of claim 1, further comprising a stator, wherein the bearing device is mounted on the stator.

5. The hydrokinetic torque coupling device of claim 1, further comprising a cam associated with the turbine-piston shell, wherein the oblique contact surface is defined by the cam.

6. The hydrokinetic torque coupling device of claim 5, wherein the cam comprises an annular plate mounted on the turbine-piston shell.

7. The hydrokinetic torque coupling device of claim 5, wherein the oblique contact surface has a non-linear, curved profile.

8. The hydrokinetic torque coupling device of claim 5, wherein the oblique contact surface has a non-linear, eccentric curved profile.

9. The hydrokinetic torque coupling device of claim 1, wherein the spring urges the rolling member substantially radially inward.

10. The hydrokinetic torque coupling device of claim 1, wherein the spring urges the rolling member substantially radially outward.

11. The hydrokinetic torque coupling device of claim 1, further comprising a stator, wherein the bearing device further comprises a housing mounted on and non-rotatable relative to the stator, wherein the spring and the rolling member are at least partially contained in the housing.

12. The hydrokinetic torque coupling device of claim 11, wherein the housing axially opposite sides with opposite windows, and wherein substantially diametrically opposite edges of the bearing member respectively protrude through the windows.

13. The hydrokinetic torque coupling device of claim 11, wherein the spring is a linear coil spring.

14. The hydrokinetic torque coupling device of claim 13, wherein the bearing device further comprises a rod around which the linear coil spring is coiled.

15. The hydrokinetic torque coupling device of claim 11, the housing containing at least one additional spring associated with the rolling member.

16. The hydrokinetic torque coupling device of claim 1, wherein the first and second engagement surfaces are frictionally locked together in the lockup mode, and wherein at least one of the first and second engagement surfaces comprises a friction lining.

17. A hydrokinetic torque coupling device for coupling together a driving shaft and a driven shaft, the torque coupling device comprising:
an impeller rotatable about rotational axis and comprising an impeller shell;
a casing comprising a casing shell having a first engagement surface;
a turbine-piston hydrodynamically drivable by the impeller and associated with an oblique contact surface, the turbine-piston comprising a turbine-piston shell and a second engagement surface facing the first engagement surface, the turbine-piston being axially displaceable to move the second engagement surface toward and away from the first engagement surface to position the hydrokinetic torque coupling device into and out of a lockup mode in which the turbine-piston is mechanically locked with the casing so as to be non-rotatable relative to the casing; and
a bearing device comprising a non-axially oriented spring and a substantially incompressible rolling member urged by the spring against the oblique contact surface to thereby exert a variable axial force against the turbine-piston shell for biasing the turbine-piston shell out of the lockup mode, wherein the variable axial force exerted by the bearing device against the turbine-piston shell decreases as the turbine-piston is axially displaced towards the lockup mode;
an output hub; and
a damper assembly interconnecting the turbine-piston to the output hub.

18. The hydrokinetic torque coupling device of claim 17, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

19. The hydrokinetic torque coupling device of claim 17, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

20. A method of assembling a hydrokinetic torque coupling device for coupling a driving shaft and a driven shaft together, comprising:
providing a torque converter rotatable about a rotational axis and comprising
an impeller comprising an impeller shell;
a turbine-piston hydrodynamically drivable by the impeller and comprising a turbine-piston shell;
a bearing device; and
operatively connecting a casing shell to the impeller shell of the torque converter to form a casing that is rotatable about the rotational axis and has a first engagement surface, the turbine-piston being axially displaceable relative to the impeller between a hydrodynamic transmission mode in which the first engagement surface and a second engagement surface of the turbine-piston are spaced from and not frictionally engaged with one another and a lockup mode in which the first and second engagement surfaces are frictionally engaged with one another to mechanically lock the turbine-piston with the casing so as to be non-rotatable relative to the casing,
wherein the bearing device comprises a non-axially oriented spring and a substantially incompressible rolling member urged by the spring against an oblique contact surface associated with the turbine-piston to thereby exert a variable axial force against the turbine-piston shell for biasing the turbine-piston shell out of the lockup mode, wherein the variable axial force exerted by the bearing device against the turbine-piston shell decreases as the turbine-piston is axially displaced towards the lockup mode.

* * * * *